July 10, 1928.
J. H. WAGENHORST
VEHICLE WHEEL
Original Filed Feb. 24, 1919
1,676,303
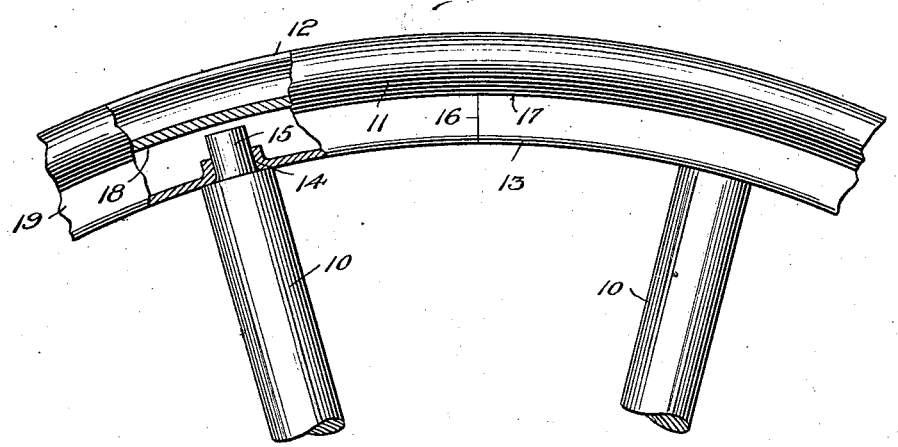
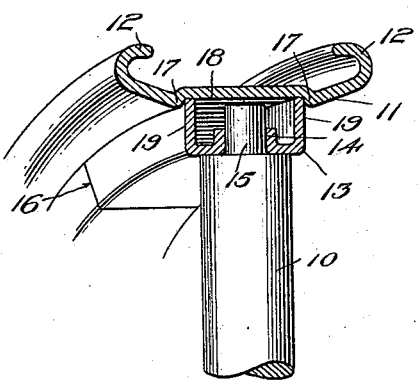

Patented July 10, 1928.

1,676,303

UNITED STATES PATENT OFFICE.

JAMES H. WAGENHORST, OF JACKSON, MICHIGAN.

VEHICLE WHEEL.

Original application filed February 24, 1919, Serial No. 278,640. Divided and this application filed December 3, 1925. Serial No. 72,920.

This invention relates to improvements in vehicle wheels and particularly, to a wheel comprising a plurality of wooden spokes and a sheet metal felly or fixed rim.

One object of the invention is to provide an exceedingly strong and durable wheel and one which can be quickly, easily and economically manufactured and assembled.

A further object is to provide a novel and simple but efficient arrangement for locking the tire-carrying rim against relative lateral movement on the felly on which it is carried.

With these and other objects in view, the invention consists in certain novel details of construction and combinations and arrangements of parts, all as will hereinafter be more fully described and the novel features thereof particularly pointed out in the appended claim.

In the accompanying drawings,—

Figure 1 is a side elevation of a portion of a wheel illustrating the preferred embodiment of the present invention; and Fig. 2 is a perspective view, partly in section, illustrating the novel construction for securing the rim against lateral movement on the felly.

As illustrated in the drawings, there is a rim supporting means interposed between the outer ends of the spokes 10 and the tire-carrying rim 11 which is provided with means, such as flanges 12, for securing the tire (not shown) thereon. In the preferred form of the invention, this interposed rim-supporting means is the felly 13 in which there is a series of apertures 14, for receiving the tenons 15 at the outer ends of the spokes.

The felly 13 may be split, as at 16, and after the spokes 10 are assembled in apertures 14 and the tire carrying-rim has been applied thereto, said rim is contracted on the felly either by heat or upsetting to complete the assemblage of the wheel. However, as there must be some means for preventing lateral movement of the tire-carrying rim 11 on the felly 13, the felly and rim are adapted to be secured together with the felly engaging against abutments on the inner face of the rim for this purpose.

The preferred arrangement for accomplishing this result consists in providing opposed laterally spaced shoulders or beads 17, as by forming a circumferentially extending channel 18 in the inner face of the base of rim 11, between which shoulders or beads the felly 13 is positioned when the wheel is being assembled. When the rim has been contracted or compressed the felly will be firmly locked between these shoulders or beads 17 so as to prevent relative lateral movement of the rim and felly. In so far as this phase of the invention is concerned, the felly and the connection between the felly and spokes may assume various forms but it is preferred that the felly be provided with the outwardly disposed legs 19 which are adapted to engage against the shoulders or beads 17 and support the tire-carrying rim.

The shoulders or beads need not be continuous around the rim but such a construction is very desirable as the beads stiffen the rim materially in addition to performing their function of securing the rim against lateral slip on the felly.

This application is a division of applicant's co-pending application Serial No. 278,640, filed February 24, 1919, on which U. S. Letters Patent No. 1,584,576 were granted May 11th, 1926.

What I claim is:

In a wheel, the combination of a sheet metal felly of channel cross-section having front and rear legs, and a continuous, tire-carrying rim having a rim base provided with parallel inwardly extending beads, said felly being transversely split and the ends thereof being disconnected except through said rim, and said rim being contracted upon the felly to bring the rim base into seating engagement with the edges of said felly legs, whereby said beads engage the felly to prevent lateral displacement and circumferential shifting of the rim with respect thereto and the split felly is contracted to anchor the wheel spokes more firmly.

JAMES H. WAGENHORST.